(12) United States Patent
Fukuoka

(10) Patent No.: US 11,721,987 B2
(45) Date of Patent: Aug. 8, 2023

(54) TECHNIQUE FOR DRIVING FAN OF BATTERY CHARGER

(71) Applicant: MAKITA CORPORATION, Anjo (JP)

(72) Inventor: Yushi Fukuoka, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 17/557,861

(22) Filed: Dec. 21, 2021

(65) Prior Publication Data
US 2022/0209561 A1 Jun. 30, 2022

(30) Foreign Application Priority Data
Dec. 25, 2020 (JP) ................ 2020-217359

(51) Int. Cl.
*H02J 7/34* (2006.01)
*H02J 7/00* (2006.01)

(52) U.S. Cl.
CPC ........ *H02J 7/00309* (2020.01); *H02J 7/0013* (2013.01); *H02J 7/0045* (2013.01); *H02J 2207/20* (2020.01)

(58) Field of Classification Search
CPC .... H02J 7/00309; H02J 7/0013; H02J 7/0045; H02J 2207/20; H02J 7/00036; H02J 7/0029; H02J 7/00304; H02J 7/0036; H02J 7/007; H02J 7/00712; H02J 7/00714; H02J 7/007182; H02J 7/007194; H02J 7/06; H05K 7/20909
USPC .......................................................... 307/18
See application file for complete search history.

(56) References Cited

U.S. PATENT DOCUMENTS

| | | | | | |
|---|---|---|---|---|---|
| 5,742,149 | A * | 4/1998 | Simpson | ............. | H02J 7/00036 320/112 |
| 6,373,228 | B1 * | 4/2002 | Sakakibara | ........... | H02J 7/0042 320/150 |
| 7,692,408 | B2 * | 4/2010 | Miyazaki | .............. | H02J 7/0042 320/128 |
| 7,956,575 | B2 * | 6/2011 | Kawano | ................ | H02J 7/0036 320/112 |
| 9,608,461 | B2 * | 3/2017 | Chen | ..................... | H01M 10/48 |
| 9,728,822 | B2 * | 8/2017 | Taga | .................... | H01M 10/613 |
| 11,523,510 | B2 * | 12/2022 | Silha | ..................... | H02J 7/0045 |
| 11,540,429 | B2 * | 12/2022 | Silha | ..................... | H02J 7/0047 |

(Continued)

FOREIGN PATENT DOCUMENTS

JP 6443663 B2 12/2018

*Primary Examiner* — Ryan Jager
(74) *Attorney, Agent, or Firm* — Oliff PLC

(57) ABSTRACT

A battery charger in one aspect of the present disclosure includes a first attachment portion, a second attachment portion, a first converter, a second converter, a fan, a first control circuit, a second control circuit, and a signal output circuit. The first control circuit (i) controls the first converter and (ii) transmits a command to drive the fan in response to a first drive condition being fulfilled. The second control circuit (i) controls the second converter and (ii) transmits a command to drive the fan in response to a second drive condition being fulfilled. The signal output circuit outputs a drive signal in response to the first control circuit and/or the second control circuit transmitting the command(s) to drive the fan. The fan feeds a cooling air flow to the first convertor and the second converter in response to receiving the drive signal.

14 Claims, 8 Drawing Sheets

(56) References Cited

U.S. PATENT DOCUMENTS

| | | | |
|---|---|---|---|
| 2010/0225280 A1* | 9/2010 | Vogel | H02M 3/3376 |
| | | | 320/145 |
| 2014/0160686 A1* | 6/2014 | Benson | H05K 7/2089 |
| | | | 361/724 |
| 2015/0303717 A1* | 10/2015 | Schneider | H01M 10/441 |
| | | | 320/113 |
| 2019/0075665 A1* | 3/2019 | Choksi | H05K 7/20209 |
| 2022/0209561 A1* | 6/2022 | Fukuoka | H02J 7/0045 |

* cited by examiner

| F1 | F2 | CIRCUIT COOLING FAN |
|---|---|---|
| Hi | Hi | ON |
| Hi | Low | |
| Low | Hi | |
| Low | Low | OFF |

FIG. 4

| So1 | So2 | Cv1 | Cv2 | P1 | P2 | RELAY AND PFC CIRCUIT |
|---|---|---|---|---|---|---|
| Low | Low | ON | ON | ON | ON | ON |
| Hi-Z | Low | OFF | ON | OFF | ON | ON |
| Low | Hi-Z | ON | OFF | ON | OFF | ON |
| Hi-Z | Hi-Z | OFF | OFF | OFF | OFF | OFF |

FIG. 6

TECHNIQUE FOR DRIVING FAN OF BATTERY CHARGER

CROSS-REFERENCE TO RELATED APPLICATIONS

This application claims the benefit of Japanese Patent Application No. 2020-217359 filed on Dec. 25, 2020 with the Japan Patent Office, the entire disclosure of which is incorporated herein by reference.

BACKGROUND

The present disclosure relates to a battery charger that can charge multiple battery packs.

Japanese Patent No. 6443663 discloses a charging device to which two battery packs can be attached. This charging device includes a control board. The control board includes two voltage conversion circuits mounted thereon. The two conversion circuits charge the respective battery packs. The single control circuit controls the voltage conversion circuits. The charging device further includes a single fan for cooling the battery packs. The fan can cool the battery packs as well as the control board.

SUMMARY

It is not easy to control charging of the two battery packs with the single control circuit. For the various purposes, such as improving efficiency of charge control, simplifying a configuration of a control circuit, and the like, it is considered to individually provide each battery pack with a control circuit. In this case, it is expected that the single fan can cool two voltage conversion circuits.

In one aspect of the present disclosure, it is desirable that two or more control circuits can efficiently control one mutual fan to cool two or more converters in a battery charger.

A battery charger in one aspect of the present disclosure includes a first attachment portion, a second attachment portion, a first converter, a second converter, a fan, a first control circuit, a second control circuit, and/or a signal output circuit.

The first attachment portion is detachably attached to a first battery pack. The first battery pack includes a first battery. The second attachment portion is detachably attached to a second battery pack. The second battery pack includes a second battery.

The first converter generates a first charging current (or a first charging power). The first charging current is supplied to, for example, the first battery pack attached to the first attachment portion. The first charging current charges the first battery. The second converter generates a second charging current (or a second charging power). The second charging current is supplied to, for example, the second battery pack attached to the second attachment portion. The second charging current charges the second battery.

The fan feeds a cooling air flow (or air flow or cooling air) to both the first converter and the second converter in response to receiving a drive signal. The drive signal is a request to drive the fan. The cooling air flow can cool the first converter and/or the second converter. Alternatively, the cooling air flow can suppress heat generation of the first converter and/or the second convener.

The first control circuit controls the first converter. The first control circuit further transmits a command (or request) to drive the fan in response to a first drive condition being fulfilled or having been fulfilled. The second control circuit controls the second converter. The second control circuit further transmits a command to drive the fan in response to the second drive condition being fulfilled or having been fulfilled. Each of the first and the second drive conditions may define a condition to drive the fan. The first and the second drive conditions may be the same or different.

The signal output circuit outputs the drive signal to the fan in response to the first control circuit and/or the second control circuit transmitting or having transmitted a command(s) to drive the fan.

In the aforementioned battery charger, each of the first control circuit and the second control circuit transmits the command to drive the fan in response to the corresponding drive condition being fulfilled. Upon the first control circuit and/or the second control circuit transmitting the command(s) to drive the fan, the signal output circuit outputs the drive signal to the fan. Consequently, the fan is driven. Accordingly, it is possible to efficiently control the single fan with the first control circuit and the second control circuit.

The first converter may generate the first charging current based on any type of electric power in any manner. The first converter may receive, for example, an alternating-current power (AC power). In this case, the first converter may convert the AC power into a direct-current power (DC power), to thereby generate the first charging current. Furthermore, the first converter may receive, for example, a DC power. In this case, the first converter may convert the DC power into another DC power of a different voltage, to thereby generate the first charging current. The second converter may generate the second charging current based on any type of electric power in any manner as in the case of the aforementioned first converter.

The first control circuit may output a first signal to the first converter in response to a first charge condition being fulfilled or having been fulfilled. The first signal commands generation of the first charging current. The first charge condition may define a condition to start charging the first battery. The first converter may generate the first charging current in response to receiving or having received the first signal. The first drive condition may be fulfilled in response to the first charge condition being fulfilled or having been fulfilled.

In the aforementioned battery charger, the fan is driven if there is an increasing possibility that the first converter generates heat as the first charging current is being generated. Consequently, the fan can be efficiently driven as needed.

The second control circuit may output a second signal to the second converter in response to a second charge condition being fulfilled or having been fulfilled. The second signal commands generation of the second charging current. The second charge condition may define a condition to start charging the second battery. The second converter may generate the second charging current in response to receiving or having received the second signal. The second drive condition may be fulfilled in response to the second charge condition being fulfilled or having been fulfilled.

In the aforementioned battery charger, the fan is driven if there is an increasing possibility that the second converter generates heat as the second charging current is being generated. Consequently, the fan can be efficiently driven as needed.

It is to be noted that the first drive condition may be fulfilled at any timing in response to the first charge condition being fulfilled or having been fulfilled. The first drive condition may be fulfilled, for example at the same time when the first charge condition is fulfilled, furthermore, the first drive condition may be fulfilled when, for example, the first signal is output to the first converter. Still furthermore, the first drive condition may be fulfilled when, for example, the first converter actually starts generating or outputting the first charging current. As in the ease of the first drive condition, the second drive condition may be fulfilled at any liming in response to the second charge condition being fulfilled or having been fulfilled.

The fan may include a blade (or vane, rotor, impeller, or rotating body) configured to rotate, to thereby generate the cooling air flow. The fan may further include an actuator. The actuator drives (that is, rotates) the blade. The actuator may include, for example, a motor. The battery charger may further include a non-rotation detection circuit. The non-rotation detection circuit detects a non-rotation state (or static state or stationary state) of the blade. The non-rotation state may be a state in which the blade is not rotating, that is, rotation of the blade is stopped. The non-rotation state may be a state in which the blade is rotating at a specified rotational speed or less. The non-rotation detection circuit outputs a non-rotation detection signal in response to detecting or having detected the non-rotation state. The non-rotation detection signal indicates that the non-rotation state is occurring (or present). Each of the first control circuit and the second control circuit may receive the non-rotation detection signal.

In the aforementioned battery charger, based on the non-rotation detection signal, each of the first control circuit and the second control circuit can execute various control processes in accordance with the state of the blade. The various control processes may include, for example, a first protection process and or a second protection process to be described below. Specifically, the first control circuit may execute the first protection process in response to receiving or having received the non-rotation detection signal during the first control circuit transmitting the command to drive the fan. The first protection process may include suppressing the first charging current or stopping generation of the first charging current.

In the aforementioned battery charger, it is possible to suppress overheat of the first converter even if the blade no longer rotates when the first converter is generating the first charging current.

Furthermore, the second control circuit may execute a second protection process in response to receiving or having received the non-rotation detection signal during the second control circuit transmitting the command to drive the fan. The second protection process may include suppressing the second charging current or stopping generation of the second charging current.

In the aforementioned battery charger, it is possible to suppress overheat of the second converter even if the blade no longer rotates when the second converter is generating the second charging current.

The first control circuit may continue the first protection process in a case where (i) the first protection process is started and (ii) the first drive condition is being fulfilled. That is, even if the non-rotation state is no longer detected (or the non-rotation detection signal is no longer output) by the non-rotation detection circuit after the first protection process is started, the first control circuit may continue the first protection process until the first drive condition is no longer fulfilled. In this battery charger, it is possible to suppress overheat of the first converter.

The second control circuit may continue the second protection process in a case where (i) the second protection process is started and (ii) the second drive condition is being fulfilled. That is, even if the non-rotation state is no longer detected (or the non-rotation detection signal is no longer output) by the non-rotation detection circuit after the second protection process is started, the second control circuit may continue the second protection process until the second drive condition is no longer fulfilled. In this battery charger, it is possible to suppress overheat of the second converter.

The signal output circuit may be distinct from the first control circuit and the second control circuit. That is, the signal output circuit may be separately (or independently) provided from the first control circuit and the second control circuit. In this battery charger, it is possible to simplify a configuration of each of the first control circuit and the second control circuit.

The signal output circuit may be a hard-wired circuit configured to output the drive signal to the fan in response to the first control circuit and/or the second control circuit transmitting the command(s) to drive the fan.

The first control circuit may output a third signal in response to the first drive condition being fulfilled or having been fulfilled. The third signal transmits the command to drive the fan. The second control circuit may output a fourth signal in response to the second drive condition being fulfilled or having been fulfilled. The fourth signal transmits the command to drive the fan. The signal output circuit may receive the third signal and the fourth signal. The signal output circuit may output the drive signal to the fan in response to receiving or having received the third signal and/or the fourth signal.

In the aforementioned battery charger, it is possible to properly and easily achieve drive of the fan based on the command of each of the first control circuit and the second control circuit.

The signal output circuit may include a logic sum (or logical sum or disjunction) circuit configured to receive the third signal and the fourth signal. The logic sum circuit may output the drive signal in response to receiving or having received the third signal and/or the fourth signal.

A method of driving a fan of a battery charger in another aspect of the present disclosure includes:

receiving a first request to drive the fan from a first control circuit of the battery charger;

receiving a second request to drive the fan from a second control circuit of the battery charger; and transmitting (or outputting) a drive signal to the fan in response to receipt of the first request and or the second request, the fan being configured to feed a cooling air flow to both a first converter and a second converter of the battery charger in response to receiving the drive signal.

The aforementioned method can exert the same effect as in the aforementioned battery charger.

BRIEF DESCRIPTION OF THE DRAWINGS

An example embodiment of the present disclosure will be described hereinafter with reference to the accompanying drawings, in which:

FIG. 4 is an explanatory diagram showing corresponding relations between drive signals F1, F2 and operation states of the circuit cooling fan;

FIG. 6 is an explanatory diagram showing corresponding relations between start signals So1, So2 and operation states of the input adjustment circuit;

DETAILED DESCRIPTION OF EXEMPLARY EMBODIMENTS

1. Embodiment (1-1) Overview or Battery Charger

Figure 1:
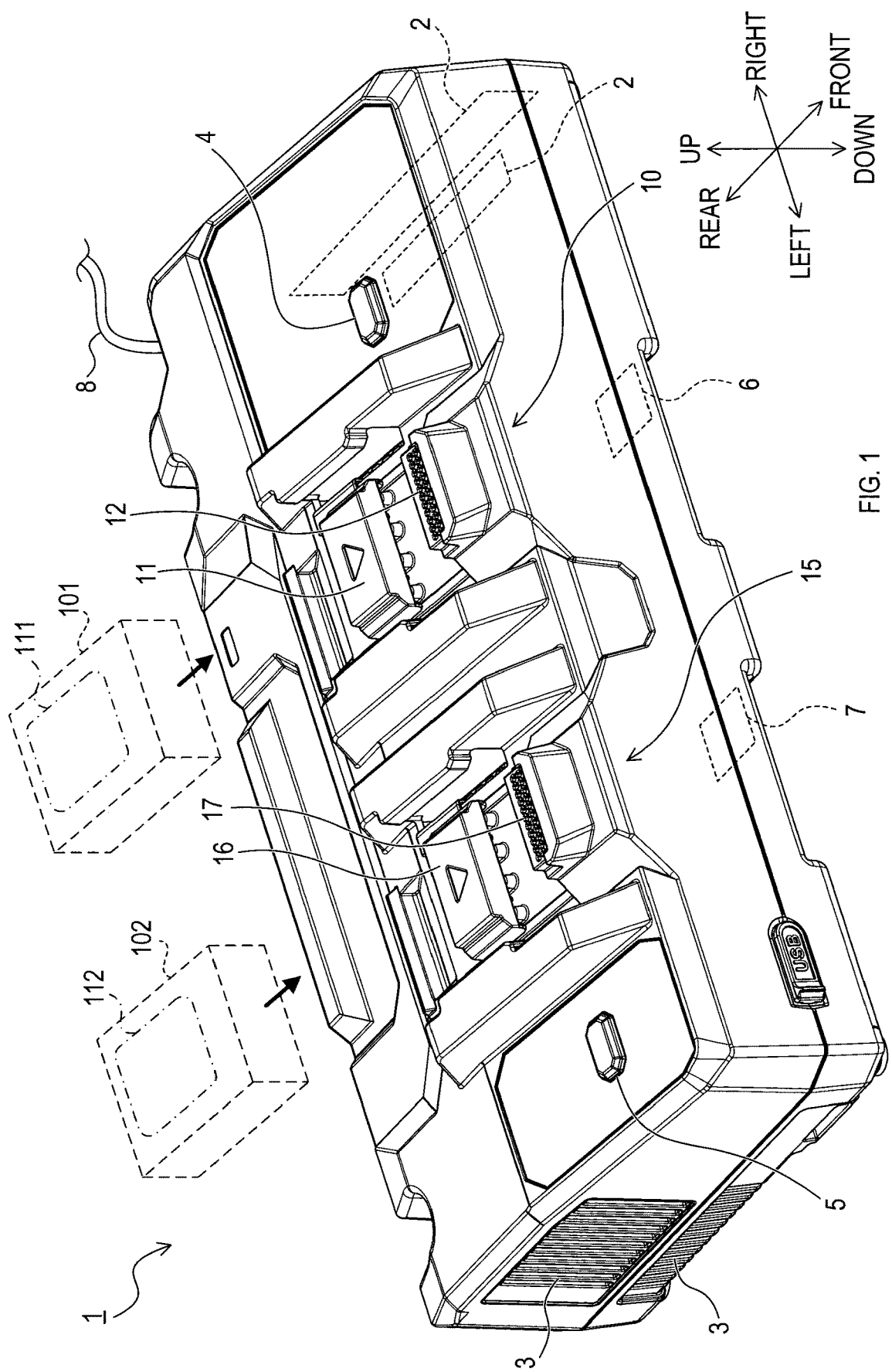
FIG. 1 is a perspective view of a battery charger of an embodiment.

As shown in FIG. 1, a battery charger 1 includes charging ports. The respective charging ports are detachably attached to battery packs. The battery charger 1 of the present embodiment includes, for example, a first charging port 10 and a second charging port 15. The battery charger 1 may include one or more additional charging port(s).

The first charging port 10 detachably receives a first battery pack 101. The first battery pack 101 includes a battery 111. The first battery pack 101 slides on an upper surface of the battery charger 1 from the rear to the front of the battery charger 1, to thereby be attached to the first charging port 10.

The first charging port 10 includes a first connector 11. The first connector 11 is configured to be electrically connected to the first battery pack 101 attached to the first charging port 10. The battery charger 1 supplies a first charging power to the first battery pack 101 via the first connector 11. The first charging power charges the battery 111.

The first charging port 10 further includes a first intake port 12. The battery charger 1 further includes a first discharge port 6. The battery charger 1 is provided with a first fan 25 inside the battery charger 1 (see, FIG. 2). For example, the first fan 25 is provided in the vicinity of the first discharge port 6. The first fan 25 cools the first battery pack 101 attached to the first charging port 10. The first fan 25 generates a first air flow. The first air flow travels from the first intake port 12 to the first discharge port 6 through the inside of the battery charger 1. That is, the first fan 25 takes in an external air from the first intake port 12 and then discharges an internal air inside the battery charger 1 from the first discharge port 6. Although detailed descriptions will be omitted, the first air flow cools the first battery pack 101.

The second charging port 15 is configured basically the same as the first charging port 10. That is, the second charging port 15 detachably receives a second battery pack 102. The second battery pack 102 includes a battery 112. The second charging port 15 includes a second connector 16. The battery charger 1 supplies a second charging power to the second battery pack 102 via the second connector 16. The second charging power charges the battery 112.

The second charging port 15 further includes a second intake port 17. The battery charger 1 further includes a second discharge port 7. The battery charger 1 is provided with a second fan 26 inside the battery charger 1 (see, FIG. 2). For example, the second fan 26 is provided in the vicinity of the second discharge port 7. The second fan 26 cools the second battery pack 102 attached to the second charging port 15. The second fan 26 generates a second air flow. The second air flow travels from the second intake port 17 to the second discharge port 7 through the inside of the battery charger 1. The second air flow cools the second battery pack 102.

Battery packs of the same type may be attachable to the respective first and second charging ports 10, 15. That is, the first battery pack 101 may be attachable to the second charging port 15, and the second battery pack 102 may be attachable to the first charging port 10. Battery packs of different types may be attachable to the respective first and second charging ports 10, 15.

The battery charger 1 further includes one or more third intake port(s) 2 and one or more third discharge port(s) 3. In the present embodiment, the battery charger 1 includes, for example, two third intake ports 2 and two third discharge ports 3 as exemplary illustrated in FIG. 1.

The first one of the third intake ports 2 may be provided, for example, in the vicinity of a lower end of a right side surface of the battery charger 1 as exemplary illustrated in FIG. 1. The second one of the third intake ports 2 may be provided, for example, in the vicinity of a right end of a bottom surface of the battery charger 1 as exemplary illustrated in FIG. 1. The third intake ports 2 may be provided, for example, adjacent to each other. The third discharge ports 3 may be provided, for example, adjacent to each other in up/down direction to a left side surface of the battery charger 1 as exemplary illustrated in FIG. 1.

Figure 2:
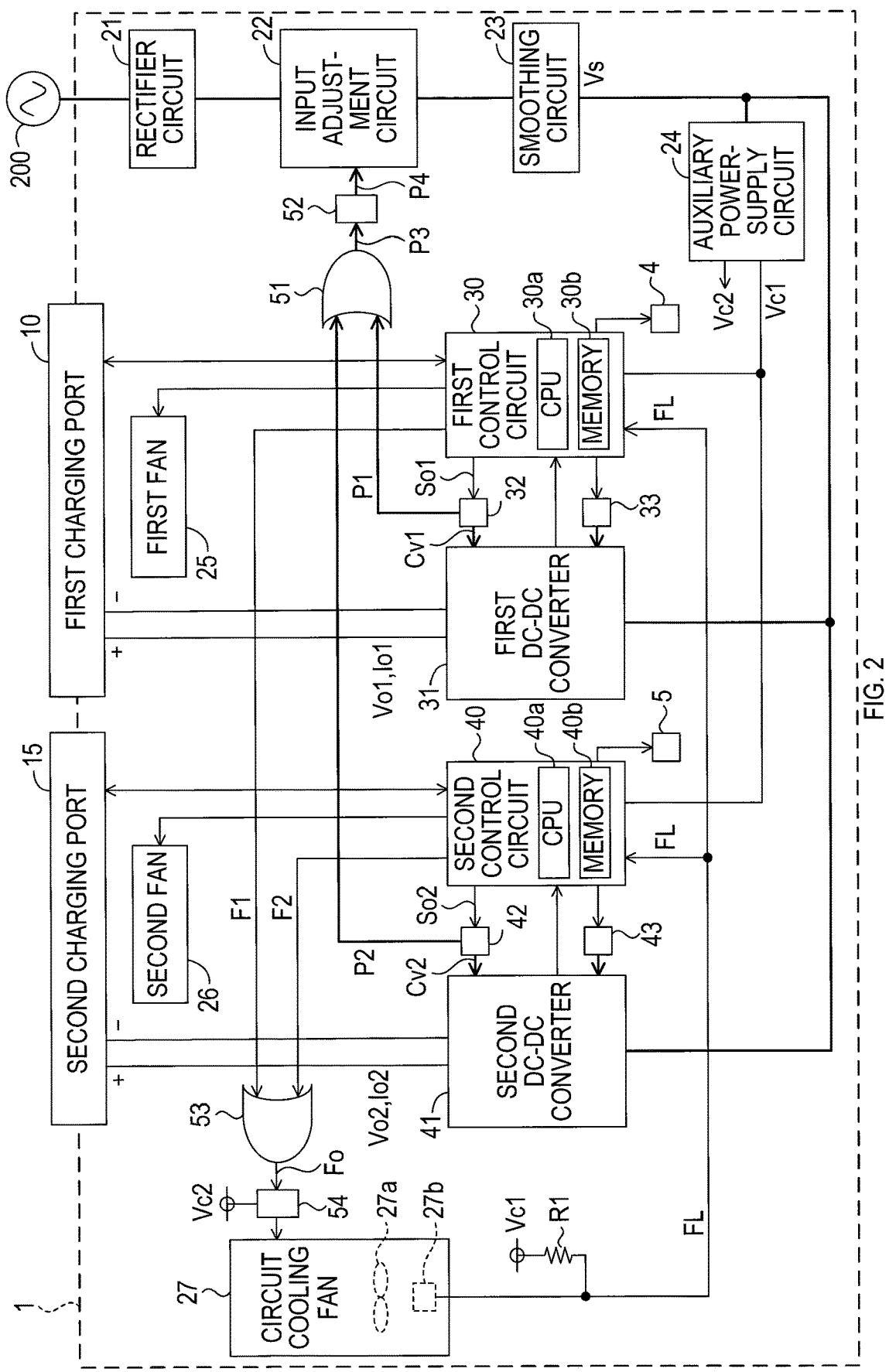
FIG. 2 is an explanatory diagram showing an electrical configuration of the battery charger of the embodiment.

The battery charger 1 is provided with a circuit cooling fan 27 inside the battery charger 1 (see, FIG. 2). The circuit cooling fan 27 is provided, for example, in the vicinity of the third discharge ports 3. The circuit cooling fan 27 is separately provided from the first and the second fans 25, 26. The circuit cooling fan 27 cools an inside of a casing of the battery charger 1. In the present embodiment, the circuit cooling fan 27 can cool at least a first DC-DC (Direct-Current to Direct-Current) converter 31 (see, FIG. 2) and a second DC-DC converter 41 (see, FIG. 2) that are described later The battery charger 1 further includes a first display 4 and a second display 5. Each of the first and the second displays 4, 5 provides (or shows or indicates) various information. In the present embodiment, each of the first and the second displays 4, 5 includes, for example, three LEDs (not shown). The three LEDs include a first LED emitting, for example, a blue light, a second LED emitting, for example, a green light, and a third LED emitting, for example, a red light.

The battery charger 1 further includes a power-supply cord 8. The battery charger 1 receives an AC power via the power-supply cord 8. The first and the second charging powers are generated from the AC power input via the power-supply cord 8.

The first and the second battery packs 101, 102 may be attachable to any devices. The first and the second battery packs 101, 102 may be attached to, for example, various electric devices (or apparatus) having motors, to thereby enable supply of electric power to the electric devices (or apparatus). Examples of the various electric devices (or apparatus) may include various job-site electric devices (or apparatus) used at job-sites, such as do-it-yourself carpentry, manufacturing, gardening, construction, and the like.

(1-2) Electrical Configuration of Battery Charger

As shown in FIG. 2, the battery charger 1 includes the first charging port 10, the second charging port 15, and the circuit cooling fan 27 described above.

The battery charger 1 receives the AC power, via the above-described power-supply cord 8, from an AC power source (or AC power supply) 200, which is external to the battery charger 1. The AC power source 200 may be of any form. For example, the AC power source 200 may be configured to supply an AC power of utility power (or general-purpose AC electric supply) having 100 volts (V), 120V-230V.

The battery charger 1 further includes a rectifier circuit 21, an input adjustment circuit 22, a smoothing circuit 23, and an auxiliary power-supply circuit 24. The rectifier circuit 21 receives the AC power and then rectifies (for example, full-wave rectifies) the AC power. The input adjustment circuit 22 includes an inrush current suppression circuit 60 (see, FIG. 5) and a power factor correction (PFC) circuit 70 (see, FIG. 5). The inrush current suppression circuit 60 suppresses an overcurrent (or a transient current) generated for a short time at the start of input of the AC power. The PFC circuit 70 improves a power factor of the AC power input to the rectifier circuit 21. Specifically, the PFC circuit 70 makes a wave form of an AC current to be input to the rectifier circuit 21 closer to a sine wave, to thereby make the power factor of the AC power closer to a value of one (1). The smoothing circuit 23 smooths an electric power output from the PFC circuit 70. The smoothing circuit 23 includes a capacitor. The capacitor smooths the electric power input to the smoothing circuit 23. The smoothing circuit 23 outputs the smoothed electric power. A voltage of the smoothed electric power, that is, a voltage output from the smoothing circuit 23 is hereinafter referred to as smoothed voltage Vs.

The auxiliary power-supply circuit 24 includes an isolation converter. The auxiliary power-supply circuit 24 generates, from the smoothed voltage Vs, multiple types of direct current voltages (DC voltages) having respective different voltage values. In the present embodiment, the auxiliary power-supply circuit 24 generates, for example, a first control voltage Vc1, a second control voltage Vc2, and an initial control voltage Vp (see, FIG. 5). The first control voltage Vc1 has a voltage value of, for example, 5 V. The second control voltage Vc2 has a voltage value of, for example, 12.5 V.

The battery charger 1 further includes the first DC-DC converter 31 and the second DC-DC converter 41. The first and the second DC-DC converters 31, 41 are isolation type converters.

The first DC-DC converter 31 receives the smoothed electric power (including the smoothed voltage Vs). The first DC-DC converter 31 generates the first charging power from the smoothed electric power. The first charging power has a first charging voltage Vo1 and a first charging current Io1. The first charging power is supplied to the battery 111 of the first battery pack 101 attached to the first charging port 10.

Upon receiving a first start command (that is, start permission), the first DC-DC converter 31 starts generating the first charging power. Specifically, the first start command corresponds to a first start signal So1 to be described later. The first start signal So1 is output from a first control circuit 30 to be described later. More specifically, the first start command corresponds to a first converter start signal Cv1 output from a first ON-transmission circuit 32 to be described later. In response to receiving the first start signal So1, the first ON-transmission circuit 32 outputs the first converter start signal Cv1. During the first converter start signal Cv1 being input to the first DC-DC converter 31, the first DC-DC converter 31 generates the first charging power in accordance with a first charge control signal that is separately input.

Upon receiving the first start signal So1, the first ON-transmission circuit 32 outputs the first converter start signal Cv1 and a first adjustment signal P1. In the present embodiment, for example, the first converter start signal Cv1 and the first adjustment signal P1 have a fixed voltage closer to an initial control voltage Vp (see, FIG. 5) to be described later.

Specifically, the first DC-DC converter 31 generates a first primary charging power from the smoothed electric power. The first DC-DC converter 31 generates the first charging power from the first primary charging power. The first DC-DC converter 31 of the present embodiment generates the first charging power in accordance with a charge method set by the first control circuit 30. The magnitude of the first charging power (for example, the value of the first charging current Io1) varies depending on the charge method. The charge method in the present embodiment includes, for example, a pre-charge and a main charge. In general, the first charging current Io1 generated by the pre-charge is lower than the first charging current Io1 generated by the main charge.

In general, the second DC-DC converter 41 is configured in the same manner as with the first DC-DC converter 31. That is, the second DC-DC converter 41 receives the smoothed electric power (having the smoothed voltage Vs). The second DC-DC converter 41 generates the second charging power from the smoothed electric power. The second charging power has a second charging voltage Vo2 and a second charging current Io2. The second charging power is supplied to the battery 112 of the second battery pack 102 attached to the second charging port 15.

Upon receiving a second start command (that is, start permission), the second DC-DC converter 41 starts generating the second charging power. Specifically, the second start command corresponds to a second start signal So2 to be described later. The second start signal So2 is output from a second control circuit 40 to be described later. More specifically, the second start command corresponds to a second convener start signal Cv2 output from a second ON-transmission circuit 42 to be described later. During the second converter start signal Cv2 being input, the second DC-DC converter 41 generates the second charging power in accordance with a second charge control signal that is separately input.

Upon receiving the second start signal So2, the second ON-transmission circuit 42 outputs the second converter start signal Cv2 and a second adjustment signal P2. In the present embodiment, for example, the second converter start signal Cv2 and the second adjustment signal P2 have a fixed voltage closer to the initial control voltage Vp (see, FIG. 5) to be described later.

Specifically, the second DC-DC converter 41 generates a second primary charging power from the smoothed electric power. The second DC-DC converter 41 generates the second charging power from the second primary charging power. The second DC-DC converter 41 of the present embodiment generates the second charging power in accordance with a charge method (for example, pre-charge or main charge) set by the second control circuit 40. In general, the second charging current Io2 generated by the pre-charge is lower than the second charging current Io2 generated by the main charge.

The battery charger 1 further includes the first control circuit 30 and the second control circuit 40 described above. The first control circuit 30 controls the first DC-DC converter 31. The first control circuit 30 of the present embodiment is in the form of a microcomputer including a CPU 30a and a memory 30b. The memory 30b may include a semiconductor memory, such as a RAM, a ROM, or a flash memory. The memory 30b stores various programs and data to be read and executed by the CPU 30a to achieve various functions of the battery charger 1. The various programs include a program of a later-described main process (see, FIG. 7) and a program of a later-described fan control process (see, FIG. 8).

Upon a first charge condition being fulfilled, the first control circuit 30 allows the first DC-DC converter 31 to generate the first charging power. Specifically, upon the first charge condition being fulfilled, the first control circuit 30 outputs the first start signal So1. The first charge condition is a condition to start charging (pre-charge or main charge) the first battery pack 101.

In the present embodiment, electric state of an output port of the first start signal So1 in the first control circuit 30 is set to, for example, Low level (hereinafter, referred to as "LOW") or High impedance (hereinafter, referred to as Hi-Z). "LOW" may correspond to, for example, a ground potential of the first control circuit 30. In the present embodiment, outputting the first start signal So1 means, for example, setting the output port of the first start signal So1 to LOW. In contrast, a slate in which the output port of the first start signal So1 is set to Hi-Z corresponds to a state in which the first start signal So1 is not being output.

Upon the first charge condition being fulfilled, the first control circuit 30 outputs the first charge control signal. The battery charger 1 further include a first control transmission circuit 33. The first control transmission circuit 33 receives the first charge control signal. The first control transmission circuit 33 includes a first photocoupler (or optocoupler or opto-isolator), which is not shown. The first charge control signal input to the first control transmission circuit 33 is output via the first photocoupler. The first charge control signal output from the first control transmission circuit 33 is input to the first DC-DC converter 31.

In the present embodiment, the first charge control signal is, for example, in the form of a pulse width modulated signal (hereinafter, referred to as "PWM signal"). The respective values of a voltage of the above-described first primary charging power and the first charging current Io1 are fed back to the first control circuit 30 from the first DC-DC converter 31. The first control circuit 30 generates the first charge control signal based on the fed back values, and then outputs the generated first charge control signal. The first charge control signal transmits a command to the first DC-DC converter 31 regarding respective values of the first charging voltage Vo1 and the first charging current Io1. The first DC-DC converter 31 generates the first charging power in accordance with the first charge control signal during the first start signal So1 being output from the first control circuit 30.

The first control circuit 30 performs data communication with the first battery pack 101 attached to the first charging port 10. Upon the first charge condition being fulfilled, the first control circuit 30 receives a command relating to a required value of the first charging current Io1 from the first battery pack 101. The first control circuit 30 controls the first DC-DC converter 31 so as to generate the first charging current Io1 in accordance with the required value.

The second control circuit 40 is configured basically the same as the first control circuit 30. That is, the second control circuit 40 controls the second DC-DC converter 41. The second control circuit 40 of the present embodiment is in the form of a microcomputer including a CPU 40a and a memory 40b. The memory 40b may include a semiconductor memory, such as a RAM, a ROM, or a flash memory. The memory 40b stores various programs and data to be read and executed by the CPU 40a to achieve various functions of the battery charger 1. As in the case of the memory 30b of the first control circuit 30, the memory 40b stores the program of the main process (see, FIG. 7) and the program of the fan control process (see, FIG. 8). Each of the first and the second control circuits 30, 40 is not limited to the microcomputer. In another embodiment, some or all of the functions executed by the CPU 30a may be achieved by one or more hardware. The same applies to the functions executed by the CPU 40a. Each of the first and the second control circuits 30, 40 may include a logic circuit including electronic components, in replacement of or in addition to the microcomputer. Each of the first and the second control circuits 30, 40 may include an Application Specific Integrated Circuit (ASIC) and or an Application Specific Standard Product (ASSP). Each of the first and the second control circuits 30, 40 may include a programmable logic device that can configure any logic circuit. Examples of such a programmable logic device include Field Programmable Gate Array (FPGA).

Upon a second charge condition being fulfilled, the second control circuit 40 allows the second DC-DC converter 41 to generate the second charging power. Specifically, upon the second charge condition being fulfilled, the second control circuit 40 outputs the second start signal So2. The second charge condition is a condition to start charging (pre-charge or main charge) the second battery pack 102.

In the present embodiment, electric state of an output port of the second start signal So2 in the second control circuit 40 is set to, for example, LOW or Hi-Z. That the output port of the second start signal So2 is set to LOW corresponds to the second start signal So2 being output. That the output port of the second start signal So2 is set to Hi-Z corresponds to the second start signal So2 not being output.

Upon the second charge condition being fulfilled, the second control circuit 40 outputs the second charge control signal. The battery charger 1 further includes a second control transmission circuit 43. The second control transmission circuit 43 receives the second charge control signal. The second control transmission circuit 43 includes a second photocoupler (not shown). The second charge control signal input to the second control transmission circuit 43 is output via the second photocoupler. The second charge control signal output from the second control transmission circuit 43 is input to the second DC-DC converter 41.

In the present embodiment, the second charge control signal is, for example, in the form of a PWM signal as in the case of the first charge control signal. A voltage value of the above described second primary charging power and a value of the second charging current Io2 are fed back to the second control circuit 40 from the second DC-DC converter 41. The second control circuit 40 generates the second charge control signal based on the fed back values, and then outputs the generated second charge control signal. The second charge control signal transmits a command to the second DC-DC converter 41 regarding respective values of the second charging voltage Vo2 and the second charging current Io2. The second DC-DC converter 41 generates the second charging power in accordance with the second charge control signal during the second start signal So2 being output from the second control circuit 40.

The second control circuit 40 performs data communication with the second battery pack 102 attached to the second charging port 15. Upon the second charge condition being fulfilled, the second control circuit 40 receives a command relating to a required value of the second charging current Io2 from the second battery pack 102. The second control circuit 40 controls the second DC-DC converter 41 so as to generate the second charging current Io2 in accordance with the required value.

Each of the first control circuit 30, the first DC-DC converter 31, the second control circuit 40, and the second DC-DC converter 41 may be mounted inside the battery charger 1 in any manner. For example, the first control circuit 30, the first DC-DC converter 31, the second control circuit 40, and the second DC-DC converter 41 may be mounted on a single common board. The first control circuit 30, the first DC-DC converter 31, the second control circuit 40, and the second DC-DC converter 41 may be accommodated in respective distinct packages.

As shown in FIG. 2, the circuit cooling fan 27 includes a blade (or vane, rotor, impeller, or rotating body) 27a and a non-rotation detection circuit 27b. The blade 27a rotates, to thereby generate an air flow. The circuit cooling fan 27 further includes an actuator (not shown). The actuator drives (that is, rotates) the blade 27a. The actuator may include, for example, a motor.

The circuit cooling fan 27 is driven with an electric power (hereinafter, referred to as "fan drive power") supplied from a fan drive circuit 54 to be described later. The fan drive power has, for example, a second control voltage Vc2. A state in which the circuit cooling fan 27 is driven means that the blade 27a rotates. More specifically, in the state as such, a rotational force for rotating the blade 27a is generated.

As the blade 27a rotates, the air flow (hereinafter, referred to as "circuit cooling air flow") is generated in which an air is taken in from the third intake port 2 and is then discharged from the third discharge port 3. The circuit cooling air flow cools the inside of the battery charger 1. In other words, the circuit cooling air flow suppresses heat generation within the battery charger 1.

In the present embodiment, the circuit cooling air flow travels on the first and/or the second DC-DC converter(s) 31, 41. Thus, the circuit cooling air flow can cool the first and or the second DC-DC converter(s) 31, 41. The circuit cooling air flow may travel on another circuit or a component or the like in addition to the first and the second DC-DC converters 31, 41, and cool the same. For example, the circuit cooling air flow may travel on the first control circuit 30, the second control circuit 40, the rectifier circuit 21, the input adjustment circuit 22, the smoothing circuit 23, and/or the auxiliary power-supply circuit 24, and cool the same.

The non-rotation detection circuit 27b detects a non-rotation state (or static state or stationary state) in which the blade 27a is not rotating. In response to detecting the non-rotation state, the non-rotation detection circuit 27b outputs a non-rotation detection signal FL. The non-rotation detection signal FL indicates that the blade 27a is in the non-rotation state. Each of the first control circuit 30 and the second control circuit 40 receives the non-rotation detection signal FL.

In the present embodiment, electric state of an output port of the non-rotation detection circuit 27b is set to, for example, LOW or Hi-Z. Furthermore, the output port of the non-rotation detection circuit 27b is applied with the first control voltage Vc1 via a resistor R1, as shown in FIG. 2. During the non-rotation detection circuit 27b not detecting the non-rotation slate, the non-rotation detection circuit 27b sets the output port of the non-rotation detection circuit 27b to LOW. A state in which the output port of the non-rotation detection circuit 27b is set to LOW corresponds to a state in which the non-rotation detection circuit 27b is not outputting the non-rotation detection signal FL. On the other hands, during the non-rotation detection circuit 27b detecting the non-rotation state, the non-rotation detection circuit 27b sets the output port of the non-rotation detection circuit 27b to Hi-Z. During this period, the output port of the non-rotation detection circuit 27b is set to High level (hereinafter, referred to as "HIGH") due to the first control voltage Vc1. A state in which the output port of the non-rotation detection circuit 27b is set to HIGH corresponds to a state in which the non-rotation detection circuit 27b is outputting the non-rotation detection signal FL.

The battery charger 1 further includes a first logic sum circuit (or first logical sum circuit, first logical disjunction circuit, or first logical sum gate) 51. The first logic sum circuit 51 is hereinafter referred to as "first OR circuit 51". The first OR circuit 51 receives the first adjustment signal P1 and the second adjustment signal P2.

The first OR circuit 51 outputs a third adjustment signal P3 when receiving the first adjustment signal P1 and/or the second adjustment signal P2. In the present embodiment, the third adjustment signal P3 has a fixed voltage closer to the initial control voltage Vp. More specifically, as described later with reference to FIG. 5, in the present embodiment, the first OR circuit 51 outputs the first adjustment signal P1 or the second adjustment signal P2 as the third adjustment signal P3. The first OR circuit 51 does not output the third adjustment signal P3 when neither the first nor the second adjustment signal P1, P2 has been input.

The battery charger 1 includes an input drive circuit 52. The input drive circuit 52 receives the third adjustment signal P3 from the first OR circuit 51. The input drive circuit 52 outputs an adjustment start signal P4 to the input adjustment circuit 22 when the third adjustment signal P3 has been input to the input drive circuit 52. In the present embodiment, the adjustment start signal P4 has, for example, a fixed voltage closer to the initial control voltage Vp. Each of the inrush current suppression circuit 60 and the PFC circuit 70 receives the adjustment start signal P4.

The first control circuit 30 outputs a first command signal F1 during the first control circuit 30 determining to drive the circuit cooling fan 27, that is, during a first drive condition being fulfilled. The first command signal F1 transmits a command to drive the circuit cooling fan 27. The first drive condition may be fulfilled in any circumstances. For example, in the present embodiment, the first drive condition may be fulfilled in response to the first charge condition being fulfilled. Specifically, the first control circuit 30 may output the first command signal F1 during, for example, the first control circuit 30 outputting the first start signal So1 or the first charging power being generated.

In the present embodiment, electric state of an output port of the first command signal F1 in the first control circuit 30 is set to, for example. LOW or HIGH. In the present embodiment, outputting the first command signal F1 means setting the output port of the first command signal F1 to HIGH. In contrast, a state in which the output port of the first command signal F1 is set to LOW corresponds to a state in which the first command signal F1 is not being output.

The second control circuit 40 outputs a second command signal F2 during the second control circuit 40 determining to drive the circuit cooling fan 27, that is, during a second drive condition being fulfilled. The second command signal F2 transmits a command to drive the circuit cooling fan 27. The second drive condition may be fulfilled in any circumstances. For example, in the present embodiment, the second drive condition may be fulfilled in response to the second charge condition being fulfilled. Specifically, the second control circuit 40 may output the second command signal F2 during, for example, the second control circuit 40 outputting the second start signal So2 or the second charging power being generated. In the present embodiment, electric state of an output port of the second command signal F2 in the second control circuit 40 is set to, for example, LOW or HIGH.

The battery charger 1 further includes a second OR circuit (or second OR gate) 53. The second OR circuit 53 is separately provided from the first control circuit 30 and the second control circuit 40. That is, the second OR circuit 53 is distinct from the first control circuit 30 and the second control circuit 40. The second OR circuit 53 receives the first and the second command signals F1, F2.

The second OR circuit 53 outputs a drive signal Fo when the second OR circuit 53 receives the first command signal F1 and/or the second command signal F2. In the present embodiment, the drive signal Fo is a signal substantially the same as the first command signal F1 or the second command signal F2. That is, as described later with reference to FIG. 3, in the present embodiment, the second OR circuit 53 outputs the first command signal F1 or the second command signal F2 as the drive signal Fo. The second OR circuit 53 does not output the drive signal Fo when neither the first nor the second command signal F1, F2 has been input.

The battery charger 1 includes the fan drive circuit 54. The fan drive circuit 54 receives the drive signal Fo from the second OR circuit 53. The fan drive circuit 54 supplies the fan drive power to the circuit cooling fan 27 when the drive signal Fo has been input to the fan drive circuit 54. Upon the fan drive power being supplied to the circuit cooling fan 27, the circuit cooling fan 27 is driven.

The first control circuit 30 executes a first protection process upon receiving the non-rotation detection signal FL during the first battery pack 101 being charged (for example, during the first start signal So1 and/or the first charge control signal being output). The first protection process includes, for example, suppressing the first charging current Io1 or stopping generation of the first charging current Io1. Even if the circuit cooling fan 27 rotates again during execution of the first protection process, the first control circuit 30 continues the first protection process until, for example, charge of the first battery pack 101 is complete.

The second control circuit 40 executes a second protection process upon receiving the non-rotation detection signal FL during the second battery pack 102 being charged (for example, during the second start signal So2 and/or the second charge control signal being output). The second protection process includes, for example, suppressing the second charging current Io2 or stopping generation of the second charging current Io2. Even if the circuit cooling fan 27 rotates again during execution of the second protection process, the second control circuit 40 continues the second protection process until, for example, charging of the second battery pack 102 is complete.

The battery charger 1 further includes the first fan 25 and the second fan 26 described above. The first control circuit 30 drives the first fan 25 during, for example, the charging of the first battery pack 101 being executed. The first control circuit 30 further drives the first display 4. The second control circuit 40 drives the second fan 26 during, for example, the second battery pack 102 being charged. The second control circuit 40 further drives the second display 5.

Figure 3:
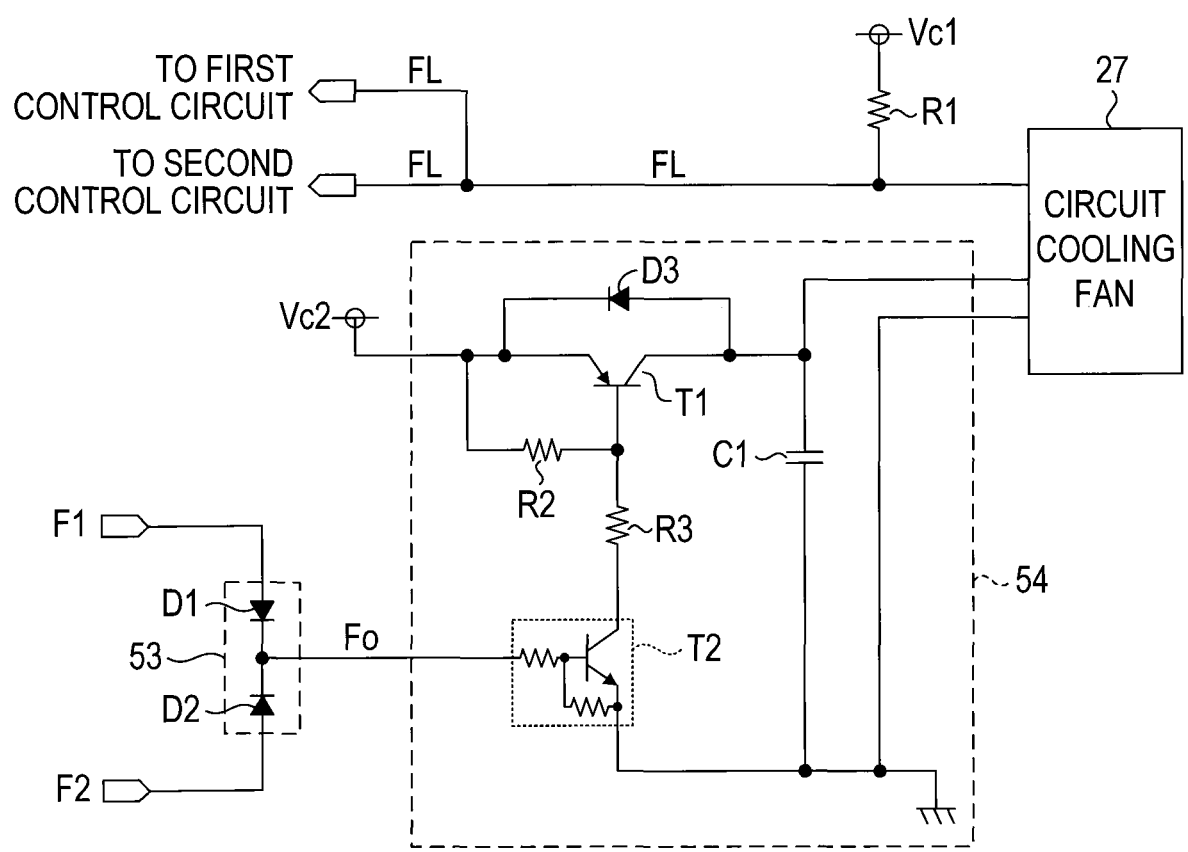
FIG. 3 is a circuit diagram showing details of a circuit related to drive of a circuit cooling fan.

(1-3) Descriptions of Specific Circuits Configuration (1-3-1) Descriptions of Circuits Related to Drive of Circuit Cooling Fan Descriptions are given to a specific configuration of circuits related to drive of the circuit cooling fan 27 with reference to FIG. 3. FIG. 3 illustrates specific circuit configurations of the second OR circuit 53 and the fan drive circuit 54.

The battery charger 1 of the present embodiment includes at least a first ground and a second ground as reference potentials of various circuits. The first ground and the second ground are electrically isolated from each other. In the present embodiment, each of the first DC-DC converter 31, the second DC-DC converter 41, and the auxiliary power-supply circuit 24 includes an isolation converter. The isolation converter includes an isolation transformer. An output electric power of the smoothing circuit 23 is input into a primary winding of the transformer. A reference potential of each circuit electrically connected to the primary winding corresponds to the first ground. On the other hand, a reference potential of each circuit electrically connected to a secondary winding of the isolation transformer corresponds to the second ground.

The second OR circuit 53 is a hard-wired circuit configured to output the drive signal Fo when the first command signal F1 and/or the second command signal F2 are/is being input to the second OR circuit 53. Specifically, the second OR circuit 53 includes a first diode D1 and a second diode D2. The first diode D1 has an anode to receive the first command signal F1. The second diode D2 has an anode to receive the second command signal F2. The first diode D1 and the second diode D2 have respective cathodes that are connected to each other and connected to the fan drive circuit 54. With such a configuration, upon the first command signal F1 and or the second command signal F2 being input to the second OR circuit 53, the first command signal F1 or the second command signal F2 is output to the fan drive circuit 54 as the drive signal Fo.

The fan drive circuit 54 includes a first transistor T1, a second transistor T2, a capacitor C1, a third diode D3, a resistor R2, and a resistor R3. The first transistor T1 is, for example, in the form of a PNP-type bipolar transistor. The second transistor 12 is, for example, in the form of a NPN-type bipolar transistor. The second transistor T2 is incorporated with a bias resistor.

The second transistor T2 has a base to receive the drive signal Fo. The second transistor T2 has an emitter connected to the second ground. The second transistor T2 has a collector connected to a base of the first transistor T1 via the resistor R3. The first transistor T1 has an emitter to be applied with the second control voltage Vc2. The resistor R2 is connected between the base and the emitter of the first transistor T1. The third diode D3 has an anode connected to a collector of the first transistor T1. The third diode D3 has a cathode connected to the emitter of the first transistor T1. The collector of the first transistor T1 is connected to a first end of the capacitor C1 and to the circuit cooling fan 27. The capacitor C1 has a second end connected to the second ground.

With such a configuration, the circuit cooling fan 27 operates as illustrated in FIG. 4 in response to the first and the second command signals F1, F2. That is, the circuit cooling fan 27 is turned ON (that is, driven) when the first command signal F1 and/or the second command signal F2 has been input to the second OR circuit 53, that is, when at least one of two input terminals of the second OR circuit 53 is HIGH.

Upon the first command signal F1 and/or the second command signal F2 being input to the second OR circuit 53, the second transistor T2 is turned ON. Upon the second transistor T2 being turned ON, the first transistor T1 is turned ON. Upon the first transistor T1 being turned ON, the second control voltage Vc2 is supplied to the circuit cooling fan 27 via the first transistor T1. Consequently, the circuit cooling fan 27 is driven.

The second transistor T2 is turned OFF when neither the first nor the second command signal F1, F2 has been input to the second OR circuit 53, that is, when each of the two input terminals of the second OR circuit 53 is LOW. Upon the second transistor T2 being turned OFF, the first transistor T1 is turned OFF. As a result, the second control voltage Vc2 is not supplied to the circuit cooling fan 27 and therefore, the circuit cooling fan 27 is turned OFF (that is, not driven).

(1-3-2) Details of Circuits Related to Stan of Input Adjustment Circuit

Figure 5:
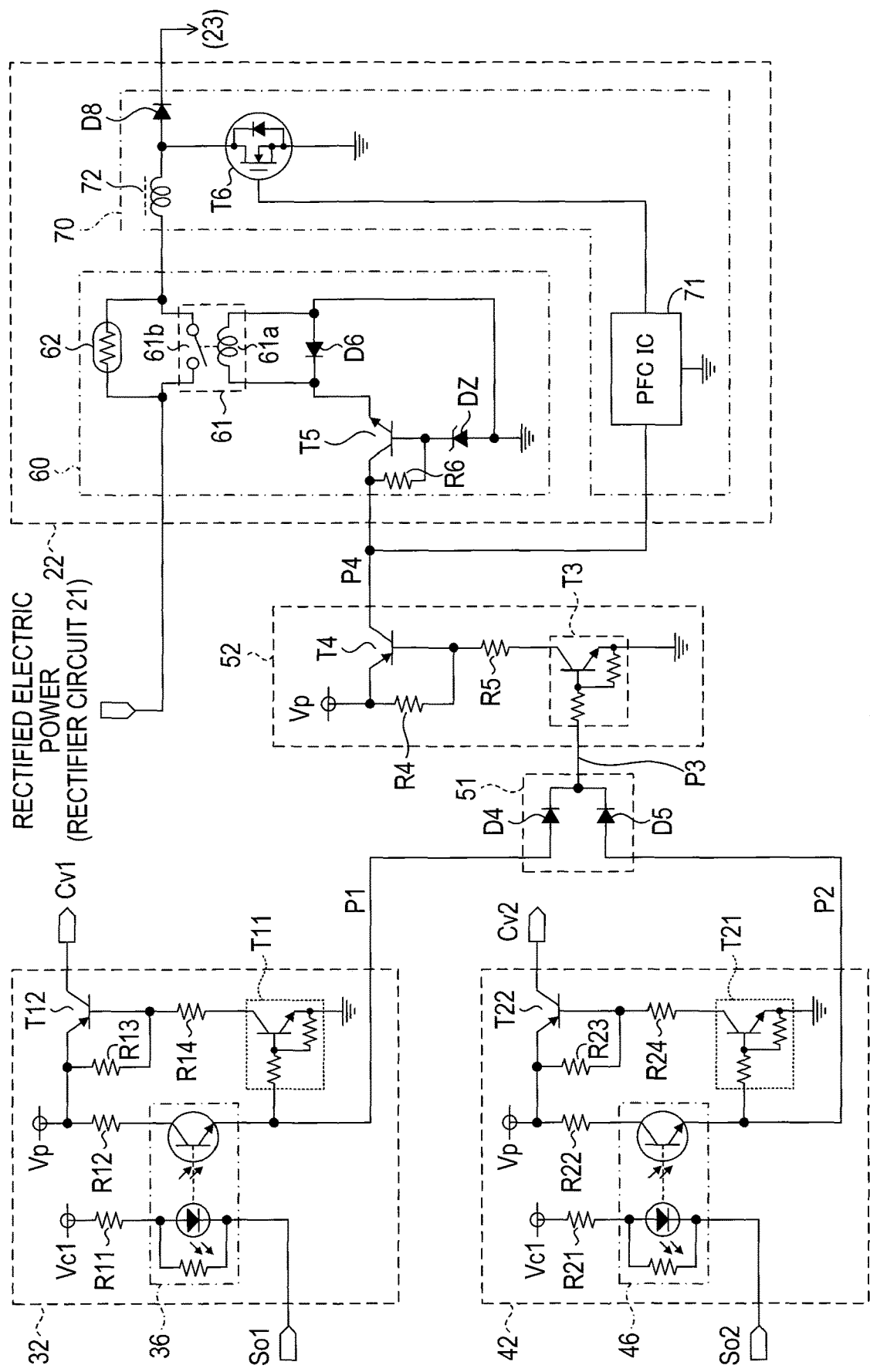
FIG. 5 is a circuit diagram showing details of a circuit related to start of an input adjustment circuit.

Descriptions are given to a specific configuration of circuits related to start of the input adjustment circuit 22 with reference to FIG. 5. FIG. 5 illustrates specific circuit configurations of the first ON-transmission circuit 32, the second ON-transmission circuit 42, the first OR circuit 51, and the input adjustment circuit 22.

The first ON-transmission circuit 32 includes a third photocoupler 36, a third transistor T11, a fourth transistor T12, and resistors R11, R12, R13, and R14. The third transistor T11 is, for example, in the form of a NPN-type bipolar transistor. The fourth transistor T12 is, for example, in the form of a PNP-type bipolar transistor. The third transistor T11 is incorporated with a bias resistor.

The third photocoupler 36 includes a first light emitting diode (that is, a primary side) and a first phototransistor (that is, a secondary side) that are electrically isolated from each other. The first light emitting diode has an anode to be applied with the first control voltage Vc1 via the resistor R11. The first light emitting diode has a cathode to receive the first start signal So1. The first phototransistor has a collector to be applied with the initial control voltage Vp via the resistor R12. The first phototransistor has an emitter connected to a base of the third transistor T11. The voltage of the emitter of the first phototransistor is applied to the third transistor T11, and is output to the first OR circuit 51 as the first adjustment signal P1. The third transistor T11 has an emitter connected to the first ground. The third transistor T11 has a collector connected to a base of the fourth transistor T12 via the resistor R14. The fourth transistor T12 has an emitter to be applied with the initial control voltage Vp. The resistor R13 is connected between the base and the emitter of the fourth transistor T12. The fourth transistor T12 outputs the voltage of a collector thereof to the first DC-DC converter 31 as the first converter start signal Cv1.

The first phototransistor of the third photocoupler 36 is turned OFF during the first start signal So1 not being input to the first ON-transmission circuit 32, that is, during an input line of the first start signal So1 being in Hi-Z. Consequently, the third transistor T11 and the fourth transistor T12 are turned OFF. Thus, as shown in FIG. 6, both the first converter start signal Cv1 and the first adjustment signal P1 are turned OFF (that is, not output).

On the other hand, the first phototransistor of the third photocoupler 36 is turned ON during the first start signal So1 being input to the first ON-transmission circuit 32, that is, during the input line of the first start signal So1 being LOW. Consequently, the third transistor T11 and the fourth transistor T12 are turned ON. Thus, as shown in FIG. 6, the first converter start signal Cv1 and the first adjustment signal P1 are turned ON (that is, output).

The second ON-transmission circuit 42 is configured basically the same as the first ON-transmission circuit 32.

That is, the second ON-transmission circuit 42 includes a fourth photocoupler 46, a fifth transistor T21, a sixth transistor T22, and resistors R21, R22, R23, and R24.

The fourth photocoupler 46 includes a second light emitting diode (that is, a primary side) and a second phototransistor (that is, a secondary side) that are electrically isolated from each other. The second light emitting diode has an anode to be applied with the first control voltage Vc1 via the resistor R21. The second light emitting diode has a cathode to receive the second start signal So2. The second phototransistor has a collector to be applied with the initial control voltage Vp via the resistor R22. The second phototransistor has an emitter connected to a base of the fifth transistor T21. The voltage of the emitter of the second phototransistor is applied to the fifth transistor T21, and is output to the first OR circuit 51 as the second adjustment signal P2. The fifth transistor T21 has an emitter connected to the first ground. The fifth transistor T21 has a collector connected to a base of the sixth transistor T22 via the resistor R24. The sixth transistor T22 has an emitter to be applied with the initial control voltage Vp. The resistor R23 is connected between the base and the emitter of the sixth transistor T22. The sixth transistor T22 outputs the voltage of a collector thereof to the second DC-DC converter 41 as the second converter start signal Cv2.

The second phototransistor of the fourth photocoupler 46 is turned OFF during the second start signal So2 not being input to the second ON-transmission circuit 42. Consequently, the fifth transistor T21 and the sixth transistor T22 are turned OFF. Thus, as shown in FIG. 6, both the second converter start signal Cv2 and the second adjustment signal P2 are turned OFF (that is, not output). On the other hand, the second phototransistor of the fourth photocoupler 46 is turned ON during the second start signal So2 being input to the second ON-transmission circuit 42. Consequently, the fifth transistor T21 and the sixth transistor T22 are turned ON. Thus, as shown in FIG. 6, the second converter start signal Cv2 and the second adjustment signal P2 are turned ON (that is, output).

The first OR circuit 51 includes a fourth diode D4 and a fifth diode D5. The fourth diode D4 has an anode to receive the first adjustment signal P1. The fifth diode D5 has an anode to receive the second adjustment signal P2. The fourth diode D4 and the fifth diode D5 have respective cathodes that are connected to each other and connected to the input drive circuit 52. With such a configuration, the first OR circuit 51 outputs the first adjustment signal P1 or the second adjustment signal P2 to the input drive circuit 52 as the third adjustment signal P3 during the first OR circuit 51 receiving the first adjustment signal P1 and or the second adjustment signal P2.

The input drive circuit 52 includes a seventh transistor T3, an eighth transistor T4, and resistors R4 and R5. The seventh transistor T3 is, for example, in the form of a NPN-type bipolar transistor. The eighth transistor T4 is, for example, in the form of a PNP-type bipolar transistor. The seventh transistor T3 is incorporated with a bias resistor.

The seventh transistor T3 has a base to receive the third adjustment signal P3. The seventh transistor T3 has an emitter connected to the first ground. The seventh transistor T3 has a collector connected to a base of the eighth transistor T4 via the resistor R5. The eighth transistor T4 has an emitter to be applied with the initial control voltage Vp. The resistor R4 is connected between the base and the emitter of the eighth transistor T4. The eighth transistor T4 outputs the voltage of a collector thereof to the input adjustment circuit 22 as the adjustment start signal P4.

The seventh transistor T3 and the eighth transistor T4 are turned OFF during the third adjustment signal P3 not being input to the input drive circuit 52. Thus, the adjustment start signal P4 is not output. On the other hand, the seventh transistor T3 and the eighth transistor T4 are turned ON during the third adjustment signal P3 being input to the input drive circuit 52. Thus, the adjustment start signal P4 is output.

The input adjustment circuit 22 includes the inrush current suppression circuit 60 and the PFC circuit 70. The inrush current suppression circuit 60 includes a ninth transistor T5, a relay 61, a resistive element 62, a resistor R6, a Zener diode DZ, and a sixth diode D6. The relay 61 includes a relay coil 61a and a relay contact 61b. The ninth transistor T5 is, for example, in the form of a NPN-type bipolar transistor. The resistive element 62 may be any electronic component including resistive components. For example, in the present embodiment, the resistive element 62 may include, for example, a Negative Temperature Coefficient (NTC) thermistor or a Positive Temperature Coefficient (PTC) thermistor.

The ninth transistor T5 has a collector to receive the adjustment start signal P4. The ninth transistor T5 has a base connected to a cathode of the Zener diode DZ. The Zener diode DZ has an anode connected to the first ground. The ninth transistor T5 has an emitter connected to a cathode of the sixth diode D6 and to a first end of the relay coil 61a. The sixth diode D6 has an anode connected to the first ground. The relay coil 61a has a second end connected to the first ground. The resistor R6 is connected between the base and the collector of the ninth transistor T5.

The relay contact 61b has a first end to receive a rectified electric power from the rectifier circuit 21. The relay contact 61b has a second end connected to a first end of a coil 72 in the PFC circuit 70. The coil 72 will be described later. The resistive element 62 is connected between the first end and the second end of the relay contact 61b.

As shown in FIG. 6, the relay 61 is turned OFF during the adjustment start signal P4 not being input to the inrush current suppression circuit 60, that is, during both the first and the second adjustment signals P1, P2 not being output. Thus, a current from the rectifier circuit 21 flows to the PFC circuit 70 via the resistive element 62. Due to the current flowing via the resistive element 62, an excessive current is inhibited from flowing to the smoothing circuit 23.

On the other hand, as shown in FIG. 6, the relay 61 is turned ON during the adjustment start signal P4 being input to the inrush current suppression circuit 60, that is, during the first adjustment signal P1 and/or the second adjustment signal P2 being output. Consequently, most of the current flowing from the rectifier circuit 21 flows to the PFC circuit 70 via the relay contact 61b.

The PFC circuit 70 includes a PFC integrated circuit (IC) 71, the coil 72 described above, a diode D8, and a tenth transistor T6. The tenth transistor T6 is, for example, a n-channel metal oxide semiconductor field-effect transistor (MOSFET). The tenth transistor T6 has a source connected to the first ground. The tenth transistor T6 has a drain connected to a second end of the coil 72 and to an anode of the diode D8. The diode D8 has a cathode connected to the smoothing circuit 23.

The PFC-IC 71 receives the adjustment start signal P4. The PFC-IC 71 controls the tenth transistor T6, to thereby adjust the power factor of the AC power. The PFC-IC 71 is turned ON (that is, operates) as shown in FIG. 6, to thereby adjust the power factor during the PFC-IC 71 receiving the adjustment start signal P4, that is, during the first adjustment signal P1 and/or the second adjustment signal P2 being output. Specifically, the PFC-IC 71 outputs a power factor control signal to a gate of the tenth transistor T6, to thereby adjust the power factor. The power factor control signal controls (that is, turns ON or OFF) the tenth transistor T6.

(1-4) Main Process

Figure 7:
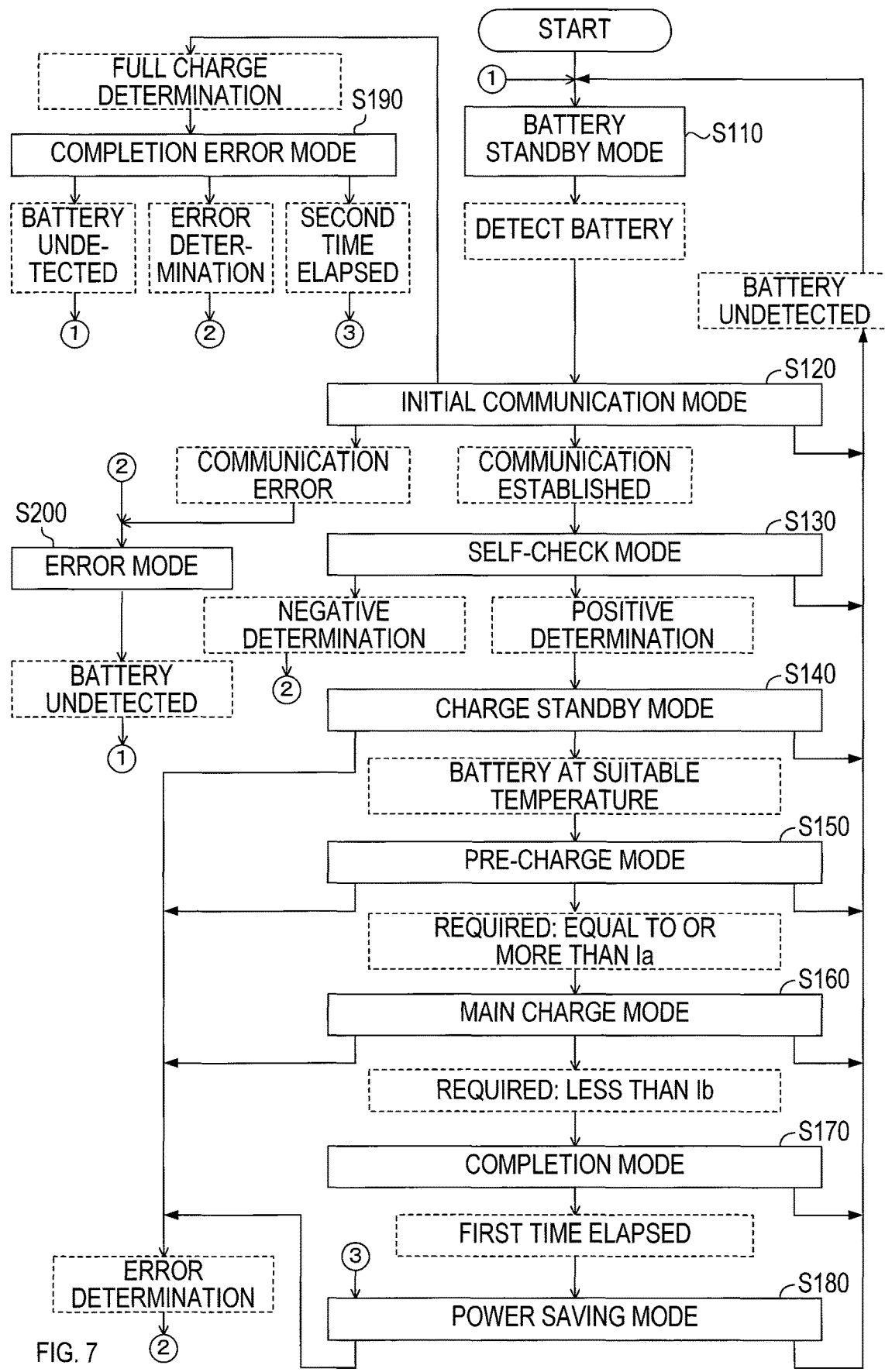
FIG. 7 is a flow chart of a main process.

Next, descriptions are given to main processes executed by the CPU 30a of the first control circuit 30 and the CPU 40a of the second control circuit 40 with reference to FIG. 7. Respective programs of the main processes are stored in the memories 30b, 40b. Hereinafter, descriptions are given, assuming that the CPU 30a of the first control circuit 30 executes the main process, as an example. Upon being started, the CPU 30a reads the program of the main process from the memory 30b and executes the program.

Upon starting the main process, the CPU 30a sets the first control circuit 30 to a battery standby mode in S110. Specifically, the CPU 30a waits for the first battery pack 101 to be attached to the first charging port 10. Upon detecting that the first battery pack 101 has been attached to the first charging port 10, the CPU 30a proceeds to S120.

The CPU 30a may employ any method to detect whether the first battery pack 101 is attached to the first charging port 10. For example, the CPU 30a may detect that the first battery pack 101 is attached to the first charging port 10 in response to a specified attachment detection signal being input from the first battery pack 101 attached to the first charging port 10.

In S120, the CPU 30a sets the first control circuit 30 to an initial communication mode. In the initial communication mode, the CPU 30a transmits specified initial communication data to the first battery pack 101. After the transmission of the initial communication data, the CPU 30a waits for a response to the initial communication data provided from the first battery pack 101. The response to the initial communication data includes charged amount information indicating whether the battery 111 is in a fully-charged state.

In the initial communication mode, if the response is not received from the first battery pack 101, then the CPU 30a transmits the initial communication data again. If the response is still not received despite the initial communication data being transmitted again for a specified number of times, then the CPU 30a determines that this is a communication error and then proceeds to S200.

In S200, the CPU 30a sets the first control circuit 30 to an error mode. In the error mode, the CPU 30a lights up, for example, the third LED in the first display 4. In the error mode, the CPU 30a waits for the first battery pack 101 to be removed from the first charging port 10. Upon detecting that the first battery pack 101 has been removed from the first charging port 10, the CPU 30a proceeds to S110. In S110, the CPU 30a sets the first control circuit 30 to the battery standby mode again.

In the initial communication mode, the CPU 30a further monitors whether the first batter) pack 101 has been attached to the first charging port 10. If having detected that the first battery pack 101 is removed from the first charging port 10, then the CPU 30a proceeds to S110.

The CPU 30a also monitors whether the first battery pack 101 is attached to the first charging port 10 in a self-check mode (S130), a charge standby mode (S140), a pre-charge mode (S150), a main charge mode (S160), a completion mode (S170), a power saving mode (S180), and a completion error mode (S190) that are described later. If having detected that the first battery pack 101 is removed from the first charging port 10, then the CPU 30a proceeds to S110.

In the initial communication mode, if a communication with the first battery pack 101 has been established, that is, if the response to the initial communication data has been received with no failure, then the CPU 30a proceeds to S130. In S130, the CPU 30a sets the first control circuit 30 to the self-check mode. In the self-check mode, the CPU 30a detects a failure (e.g., faulty state, defect, fault, improper state, abnormal state, or malfunction) of a diagnosed circuit (i.e., a circuit subjected to diagnosis). The diagnosed circuit includes a circuit used to control the first DC-DC converter 31. Examples of the diagnosed circuit includes the first control circuit 30.

If the CPU 30a has detected a failure of the diagnosed circuit, then the CPU 30a makes a negative determination and proceeds to S200 (error mode). If all the diagnosed circuits are in a proper state, then the CPU 30a makes a positive determination and proceeds to S140.

In S140, the CPU 30a sets the first control circuit 30 to the charge standby mode. In the charge standby mode, the CPU 30a executes a specified first communication with the first battery pack 101. The CPU 30a may perform the first communication, for example, on a periodic basis. In the first communication, the CPU 30a obtains, for example, first temperature information from the first battery pack 101. The first temperature information indicates the temperature of the battery 111. If the first temperature information indicates an overheated state of the battery 111, then the CPU 30a makes an error determination and proceeds to S200 (error mode). The CPU 30a may determine that the battery 111 is in the overheated state if, for example, the temperature indicated by the first temperature information reaches a first temperature or higher. The first temperature may be any temperature. For example, the first temperature may be 80° C.

The CPU 30a also performs the first communication with the first battery pack 101, to thereby monitor the temperature of the battery 111 in the pre-charge mode (S150), the main charge mode (S160), the completion mode (S170), the power saving mode (S180), and the completion error mode (S190) that are described later. If the battery 111 is in the overheated state, then the CPU 30a makes the error determination and proceeds to S200 (error mode).

In the charge standby mode, the CPU 30a further waits to receive the first temperature information indicating the temperature of the battery 111 of less than a second temperature. The second temperature may be any temperature equal to or less than the first temperature. The second temperature may be, for example, 60° C. In the charge standby mode, if the first temperature information indicates that the battery 111 is less than the second temperature, then the CPU 30a determines that the temperature of the battery 111 is proper (that is, temperature at which charge of the battery 111 can be performed). Then, the CPU 30a proceeds to S150.

In S150, the CPU 30a sets the first control circuit 30 to the pre-charge mode. The pre-charge mode may be set if a voltage value of the battery 111 is less than a specified lower limit voltage value. If the voltage value of the battery 111 is equal to or more than the lower limit voltage value, then the CPU 30a may proceed to S160 without proceeding to the pre-charge mode or without substantially executing the charge according to the pre-charge mode. The CPU 30a may determine whether to proceed to the pre-charge mode in response to, for example, a command from the first battery pack 101. That is, the first battery pack 101 itself may determine whether to perform the pre-charge, and notify the battery charger 1 of a determination result. Alternatively, for example, the CPU 30a may determine whether to execute the pre-charge in accordance with the required value commanded by the first battery pack 101. For example, the CPU 30a may set the first control circuit 30 to the pre-charge mode if the required value is less than a specified value (for example, less than 1 ampere (A)). The CPU 30a may proceed to S160 without executing the pre-charge (or omit proceeding to the pre-charge mode) if the required value is equal to or more than the specified value. Here, setting the first control circuit 30 to the pre-charge mode may corresponds to the first charge condition being fulfilled, which is described above.

In the pre-charge mode, the CPU 30a executes the pre-charge of the battery 111. Specifically, the CPU 30a outputs the first start signal So1 and the first charge control signal. As described above, the CPU 30a controls the first DC-DC converter 31 so as to generate the first charging current Io1 lower than the first charging current Io1 generated by the main charge. A value of the first charging current Io1 to be generated during the pre-charge may be, for example, notified through the above-described required value commanded by the first battery pack 101. In this case, the CPU 30a may output the first charge control signal so as to generate the first charging current Io1 having a value consistent with the required value or a value lower than the required value.

In the pre-charge mode, if the required value commanded from the first battery pack 101 has become equal to or more than a first value Ia, then the CPU 30a proceeds to S160. In S160, the CPU 30a sets the first control circuit 30 to the main charge mode. The first value Ia corresponds to criteria for determining whether to proceed to the main charge mode from the pre-charge mode. The first value Ia may be any value. The first value Ia may be, for example, 1A.

In the main charge mode, limitation on the first charging current Io1 as defined in the pre-charge mode is removed. In the main charge mode, the CPU 30a controls the first charging current Io1 in accordance with a charge state of the battery 111. For example, the CPU 30a may control the first DC-DC converter 31 so as to generate the first charging current Io1 having the required value commanded by the first battery pack 101. Setting the first control circuit 30 to the pre-charge mode may correspond to the first charge condition being fulfilled, which is described above.

In the main charge mode, if the required value commanded by the first battery pack 101 has become less than a second value Ib, then the CPU 30a proceeds to S170. In S170, the CPU 30a sets the first control circuit 30 to the completion mode. The second value Ib corresponds to a criteria for determining whether to proceed to the completion mode from the main charge mode. The second value Ib may be any value within a range of values lower than the first value Ia. The second value may be, for example, 0 A.

In the completion mode, the CPU 30a stops the first start signal So1 and the first charge control signal, to thereby stop the first DC-DC converter 31 from generating the first charging power. Furthermore, the CPU 30a lights up, for example the second LBD in the first display 4. Still furthermore, in the completion mode, the CPU 30a waits for a first time period to elapse after proceeding to the completion mode. The first time period may be any time period. For example, the first time period may be 60 minutes. Upon the first time period having elapsed since the CPU 30a proceeded to the completion mode, the CPU 30a proceeds to S180.

In S180, the CPU 30a sets the first control circuit 30 to the power saving mode. In the power saving mode, the CPU 30a continues a given time period of a specified communication with the first battery pack 101, and thereafter slops the specified communication with the first battery pack 101.

In the initial communication mode of S120, if the charge amount information already indicates the fully-charged state, then the CPU 30a commands that the first battery pack 101 re-transmit the charge amount information. The CPU 30a may request two or more re-transmissions of the charge amount information. If receiving the charge amount information indicating the fully-charged state in response to the request for re-transmission, then the CPU 30a determines that the battery 111 is already in the fully-charged state and proceeds to S190. In S190, the CPU 30a sets the first control circuit 30 to the completion error mode.

In the completion error mode, the CPU 30a lights up, for example, the second LED in the first display 4. In the completion error mode, the CPU 30a waits for a second time period to elapse after proceeding to the error completion mode. The second time period may be any time period. The second time period may be, for example, 60 minutes. Upon the second time period having elapsed since the CPU 30a proceeded to the completion error mode, the CPU 30a proceeds to S180.

Likewise, the main process described above is executed in the second control circuit 40. It is to be noted that the main process executed in the second control circuit 40 controls the second DC-DC converter 41. Furthermore, the main process executed in the second control circuit 40 monitors and communicate with the battery (for example, the second battery pack 112 of the second battery 102) to be attached to the second charging port 15.

(1-5) Fan Control Process

Figure 8:
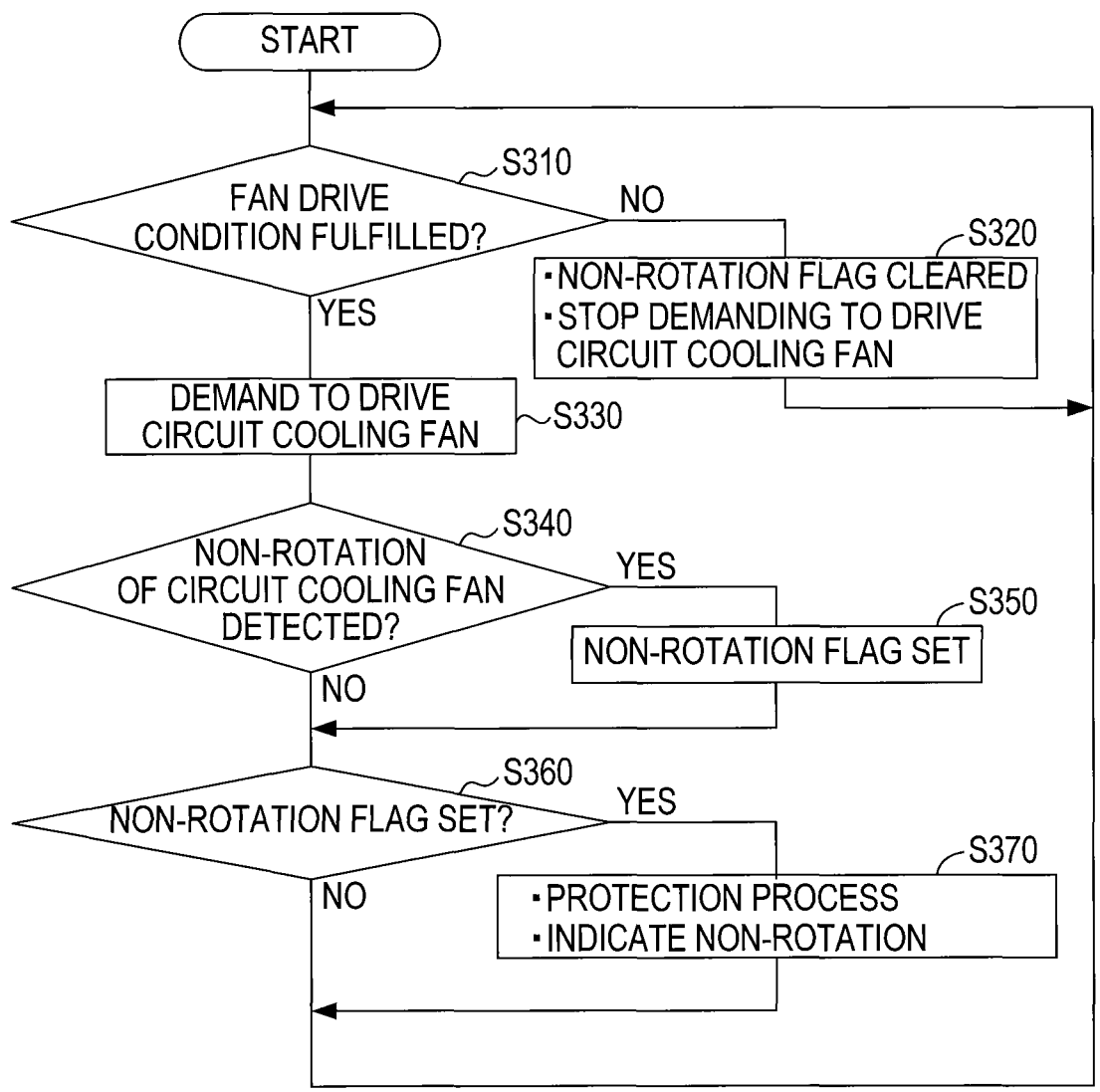
FIG. 8 is a flow chart of a fan control process.

Next, descriptions are given, with reference to FIG. 8, to respective fan control processes executed by the CPU 30a of the first control circuit 30 and the CPU 40a of the second control circuit 40. Programs of the respective control processes are stored in the memories 30b, 40b. Hereinafter, descriptions are given, assuming that the CPU 30a of the first control circuit 30 executes the fan control process, as an example. Upon being started, the CPU 30a reads the program of the fan control process from the memory 30b and executes the fan control process concurrently with the main process described above.

Upon starting the fan control process, the CPU 30a determines whether a fan drive condition is fulfilled in S310. The fan drive condition corresponds to the first drive condition or the second drive condition described above. The fan drive condition in the fan control process executed in the first control circuit 30 corresponds to the first drive condition. The fan drive condition in the fan control process executed in the second control circuit 40 corresponds to the second drive condition. As described above, the first drive condition may be fulfilled in response to, for example, the first charge condition being fulfilled. More specifically, the first drive condition may be fulfilled in response to the first control circuit 30 being set to the pre-charge mode or the main charge mode. If the fan drive condition is not fulfilled in S310, then the CPU 30a proceeds to a process of S320.

In S320, the CPU 30a clears a non-rotation flag. In S320, the CPU 30a further stops a drive request of the circuit cooling fan 27. Specifically, the CPU 30a does not output the first command signal F1. After the process of S320, the CPU 30a proceeds to S310. If the first command signal F1 is no longer output due to S320, but the second command signal F2 is being output from the second control circuit 40a, the circuit cooling fan 27 is driven. That the first command signal F1 is not output may mean that at least cooling of the first DC-DC converter 31 is not required (or there is a lesser necessity of cooling).

If the fan drive condition has been fulfilled in S310, then the CPU 30a proceeds to S330. In S330, the CPU 30a outputs the first command signal F1. As a result, even if the second command signal F2 is not output, the circuit cooling fan 27 is driven in accordance with the first command signal F1.

In S340, the CPU 30a determines, based on the non-rotation detection signal FL, whether the circuit cooling fan 27 is in the non-rotation state. If the circuit cooling fan 27 is in the non-rotation state, then the CPU 30a proceeds to a process of S350. In S350, the CPU 30a sets the non-rotation flag. After the process of S350, the CPU 30a proceeds to S360. If the circuit cooling fan 27 is not in the non-rotation state in S340, then the CPU 30a proceeds to S360.

In S360, the CPU 30a determines whether the non-rotation flag is set or has been set. If the non-rotation flag has not been set, then the CPU 30a proceeds to S310. If the non-rotation flag has been set, then the CPU 30a proceeds to a process of S370.

In S370, the CPU 30a executes the protection process. The protection process corresponds to the first protection process or the second protection process described above. The protection process in the fan control process executed in the first control circuit 30 corresponds to the first protection process. The protection process in the fan control process executed in the second control circuit 40 corresponds to the second protection process.

In S370, the CPU 30a further executes non-rotation display. Specifically, the CPU 30a alternately lights up, for example, the first LED and the third LED in the first display 4. The CPU 30a executes the non-rotation display as such, to thereby notify a user of the battery charger 1 that the circuit cooling fan 27 is in the non-rotation state.

After the process of S370, the CPU 30a proceeds to S310. It is to be noted that even after the CPU 30a proceeds to S310, the process of S370 continues as long as the non-rotation flag is set.

(1-6) Effects of the Present Embodiment

The present embodiment described hereinabove exerts effects (1a) to (1e) below.

(1a) In the battery charger 1 of the present embodiment, each of the first and the second control circuits 30, 40 transmits the command to drive the circuit cooling fan 27 in response to its corresponding drive condition being fulfilled. Upon the first control circuit 30 and or the second control circuit 40 transmitting the command to drive the circuit cooling fan 27, the drive signal Fo is output to the circuit cooling fan 27. More specifically, in the present embodiment, the drive signal Fo is input to the fan drive circuit 54. The fan drive circuit 54 that has received the drive signal Fo supplies the second control voltage Vc2 to the circuit cooling fan 27. Consequently, the circuit cooling fan 27 is driven.

Thus, it is possible to efficiently control the single circuit cooling fan 27 by the first and the second control circuits 30, 40.

(1b) In the present embodiment, the second OR circuit 53 is separately provided from the first and the second control circuits 30, 40. In response to the first drive condition being fulfilled, the first control circuit 30 outputs the first command signal F1, to thereby transmits the command to drive the circuit cooling fan 27. In response to the second drive condition being fulfilled, the second control circuit 40 outputs the second command signal F2, to thereby transmits the command to drive the circuit cooling fan 27. Consequently, it is possible to simplify respective configurations of the first and the second control circuits 30, 40.

(1c) The first and the second command signals F1, F2 are input to the second OR circuit 53. In response to receiving the first command signal F1 and/or the second command signal F2, the second OR circuit 53 outputs the drive signal Fo. Consequently, it is possible to properly and easily achieve drive of the circuit cooling fan 27 based on the command of each of the first and the second control circuits 30, 40.

(1d) In response to the first charge condition being fulfilled, the first control circuit 30 outputs the first command signal F1. That is, the circuit cooling fan 27 is driven if there is an increasing possibility that the first DC-DC converter 31 generates heat as the first charging current Io1 is being generated.

Likewise, in response to the second charge condition being fulfilled, the second control circuit 40 outputs the second command signal F2. That is, the circuit cooling fan 27 is driven if there is an increasing possibility that the second DC-DC converter 41 generates heat as the second charging current Io2 is being generated.

Consequently, it is possible to efficiently drive the circuit cooling fan 27 as needed.

(1e) The battery charger 1 of the present embodiment includes the non-rotation detection circuit 27b. Each of the first control circuit 30 and the second control circuit 40 can execute various controls based on whether the non-rotation detection signal FL is output from the non-rotation detection circuit 27b (that is, based on a state of the blade 27a).

Specifically, the first control circuit 30 executes the first protection process in response to receiving the non-rotation detection signal FL during the first control circuit 30 transmitting the command to drive the circuit cooling fan 27. Likewise, the second control circuit 40 executes the second protection process in response to receiving the non-rotation detection signal FL during the second control circuit 40 transmitting the command to drive the circuit cooling fan 27. Accordingly, even if the blade 27a no longer rotates during charging of the battery 111 and/or the battery 112, it is possible to suppress overheat of the first DC-DC convener 31 and/or the second DC-DC converter 41.

In the present embodiment, the first charging port 10 corresponds to one example of the first attachment portion of the present disclosure. The second charging port 15 corresponds to one example of the second attachment portion of the present disclosure. The first DC-DC converter 31 corresponds to one example of the first converter of the present disclosure. The second DC-DC converter 41 corresponds to one example of the second converter of the present disclosure. The drive signal Fo or the fan drive power from the fan drive circuit 54 based on the drive signal Fo corresponds to one example of the drive signal of the present disclosure. The circuit cooling fan 27 corresponds to one example of the fan of the present disclosure. The second OR circuit 53 or a combination of the second OR circuit 53 and the fan drive circuit 54 corresponds to one example of the signal output circuit of the present disclosure. The first start signal So1 and/or the first converter start signal Cv1 correspond(s) to one example of the first signal of the present disclosure. The second start signal So2 and/or the second converter start signal Cv2 correspond(s) to one example of the second signal of the present disclosure. The first command signal FL corresponds to one example of the third signal of the present disclosure. The second command signal F2 corresponds to the fourth signal of the present disclosure.

2. Other Embodiments

Although the embodiment of the present disclosure has been described hereinabove, the present disclosure is not limited to the above-described embodiment and may be practiced in various forms.

(2-1) In the above-described embodiment, the second OR circuit 53 has been described as one example of the signal output circuit of the present disclosure. However, the signal output circuit of the present disclosure may be embodied in a different way described in the embodiment of the second OK circuit 53. Specifically, the signal output circuit of the present disclosure may output a drive signal in any way in response to receiving or having received drive requests/a drive request from the first control circuit 30 and or the second control circuit 40.

The function of the second OR circuit 53 may be achieved by software processing in the first control circuit 30 or the second control circuit 40. Specifically, for example, the second command signal F2 from the second control circuit 40 may be input to the first control circuit 30. The CPU 30a of the first control circuit 30 may output the first command signal F1 by software processing in response to the first drive condition being fulfilled and/or the first control circuit 30 receiving the second command signal F2 from second control circuit 40. In this case, the first command signal F1 may be input to the fan drive circuit 54 as the drive signal Fo.

(2-2) The non-rotation detection circuit 27b may be separately (or independently) provided from the circuit cooling fan 27.

(2-3) The present disclosure can be applied to a battery charger including a first and a second converters different from the first and the second DC-DC converters 31, 41. For example, each of the first and the second converters of the present disclosure may have functions of the rectifier circuit 21, the input adjustment circuit 22, and the smoothing circuit 23. That is, each of the first and the second converters may be in the form of an AC-DC (Alternating-Current to Direct-Current) converter.

(2-4) Two or more functions of one element of the aforementioned embodiments may be performed by two or more elements, and one function of one element may be performed by two or more elements. Furthermore, two or more functions of two or more elements may be performed by one element, and one function performed by a plurality of elements may be performed by one element. Furthermore, a part of the configurations of the aforementioned embodiments may be omitted. Still further, at least a part of the configurations of the aforementioned embodiments may be added to or replaced with the configurations of the other above-described embodiments.

What is claimed is:

1. A battery charger comprising:
   a first attachment portion configured to be detachably attached to a first battery pack, the first battery pack including a first battery;
   a second attachment portion configured to be detachably attached to a second battery pack, the second battery pack including a second battery;
   a first converter configured to output a first charging current to the first attachment portion, the first charging current charging the first battery;

a second converter configured to output a second charging current to the second attachment portion, the second charging current charging the second battery;
a fan configured to feed a cooling air flow to both the first converter and the second converter in response to the fan receiving a drive signal;
a first control circuit configured to (i) control the first converter and (ii) transmit a first command to drive the fan in response to a first drive condition being fulfilled or having been fulfilled;
a second control circuit configured to (i) control the second converter and (ii) transmit a second command to drive the fan in response to a second drive condition being fulfilled or having been fulfilled; and
a signal output circuit configured to output the drive signal to the fan in response to the first control circuit and/or the second control circuit transmitting or having transmitted the first and/or second command to drive the fan.

2. The battery charger according to claim 1,
wherein the first control circuit is configured to output a first signal to the first converter in response to a first charge condition being fulfilled or having been fulfilled, the first signal commanding generation of the first charging current,
the first converter is configured to generate the first charging current in response to receiving or having received the first signal, and
the first drive condition is fulfilled in response to the first charge condition being fulfilled or having been fulfilled.

3. The battery charger according to claim 1,
wherein the second control circuit is configured to output a second signal to the second converter in response to a second charge condition being fulfilled or having been fulfilled, the second signal commanding generation of the second charging current,
the second converter is configured to generate the second charging current in response to receiving or having received the second signal, and
the second drive condition is fulfilled in response to the second charge condition being fulfilled or having been fulfilled.

4. The battery charger according to claim 1,
wherein the fan includes a blade configured to rotate, to thereby generate the cooling air flow,
the battery charger further includes: a non-rotation detection circuit configured to detect a non-rotation state of the blade, to thereby output a non-rotation detection signal, indicating that the non-rotation state is occurring, and
each of the first control circuit and the second control circuit is configured to receive the non-rotation detection signal.

5. The battery charger according to claim 4,
wherein the first control circuit is configured to execute a first protection process in response to the first control circuit receiving or having received the non-rotation detection signal during the first control circuit transmitting the first command to drive the fan, and
the first protection process includes suppressing the first charging current or stopping generation of the first charging current.

6. The battery charger according to claim 5, wherein the first control circuit is configured to continue the first protection process in a case where (i) the first protection process is started and (ii) the first drive condition is being fulfilled.

7. The battery charger according to claim 4,
wherein the second control circuit is configured to execute a second protection process in response to the second control circuit receiving or having received the non-rotation detection signal during the second control circuit transmitting the second command to drive the fan, and
the second protection process includes suppressing the second charging current or stopping generation of the second charging current.

8. The battery charger according to claim 7, wherein the second control circuit is configured to continue the second protection process in a case where (i) the second protection process is started and (ii) the second drive condition is being fulfilled.

9. The battery charger according to claim 1, wherein the signal output circuit is distinct from the first control circuit and the second control circuit.

10. The battery charger according to claim 1, wherein the signal output circuit is a hard-wired circuit configured to output the drive signal to the fan in response to the first control circuit and/or the second control circuit transmitting the first and/or second command to drive the fan.

11. The battery charger according to claim 10,
wherein the first control circuit is configured to output a third signal in response to the first drive condition being fulfilled or having been fulfilled, the third signal transmitting the first command to drive the fan,
the second control circuit is configured to output a fourth signal in response to the second drive condition being fulfilled or having been fulfilled, the fourth signal transmitting the second command to drive the fan,
the signal output circuit is configured to receive the third signal and the fourth signal, and
the signal output circuit is configured to output the drive signal to the fan in response to the signal output circuit receiving or having received the third signal and/or the fourth signal.

12. The battery charger according to claim 11, wherein the signal output circuit includes a logic sum circuit configured to receive the third signal and the fourth signal, the logic sum circuit being configured to output the drive signal in response to the logic sum circuit receiving or having received the third signal and/or the fourth signal.

13. A method of driving a fan of a battery charger, the method comprising:
receiving a first request to drive the fan from a first control circuit of the battery charger;
receiving a second request to drive the fan from a second control circuit of the battery charger; and
transmitting a drive signal to the fan in response to receipt of the first request and/or the second request, the fan being configured to feed a cooling air flow to both a first converter and a second converter of the battery charger in response to receiving the drive signal, the first converter being associated with a first battery, the second converter being associated with second battery, and the second battery being distinct from the first battery.

14. A method of driving a fan of a battery charger, the method comprising:
receiving a first request to drive the fan from a first control circuit of the battery charger;
receiving a second request to drive the fan from a second control circuit of the battery charger;
transmitting a drive signal to the fan in response to receipt of the first request and/or the second request, the fan being configured to feed a cooling air flow to both a first converter and a second converter of the battery charger in response to receiving the drive signal; and charging a first battery and a second battery respectively with the first converter and the second converter, the second battery being distinct from the first battery.

\* \* \* \* \*